(12) United States Patent
George et al.

(10) Patent No.: US 9,984,287 B2
(45) Date of Patent: May 29, 2018

(54) METHOD AND IMAGE PROCESSING APPARATUS FOR PERFORMING OPTICAL CHARACTER RECOGNITION (OCR) OF AN ARTICLE

(71) Applicants: Tomson Ganapathiplackal George, Paika (IN); Sudheesh Joseph, Kochi (IN)

(72) Inventors: Tomson Ganapathiplackal George, Paika (IN); Sudheesh Joseph, Kochi (IN)

(73) Assignee: Wipro Limited, Bangalore (IN)

( * ) Notice: Subject to any disclaimer, the term of this patent is extended or adjusted under 35 U.S.C. 154(b) by 77 days.

(21) Appl. No.: 14/746,198

(22) Filed: Jun. 22, 2015

(65) Prior Publication Data
US 2016/0259991 A1   Sep. 8, 2016

(30) Foreign Application Priority Data
Mar. 5, 2015   (IN) .......................... 1070/CHE/2015

(51) Int. Cl.
| G06K 9/34 | (2006.01) |
| G06K 9/00 | (2006.01) |
| G06K 9/03 | (2006.01) |
| G06K 9/32 | (2006.01) |

(52) U.S. Cl.
CPC .......... *G06K 9/00469* (2013.01); *G06K 9/03* (2013.01); *G06K 9/036* (2013.01); *G06K 9/3233* (2013.01); *G06K 2209/01* (2013.01)

(58) Field of Classification Search
USPC ........ 1/1; 358/1.13; 382/131, 161, 177, 178, 382/182, 209; 705/30
See application file for complete search history.

(56) References Cited

U.S. PATENT DOCUMENTS

| 5,680,478 | A  | * | 10/1997 | Wang ................. | G06K 9/00456 382/171 |
| 6,473,524 | B1 | * | 10/2002 | Reda ...................... | G06K 9/344 382/178 |
| 7,480,411 | B1 | * | 1/2009  | Tzadok .................. | G06K 9/03 358/1.11 |
| 7,499,588 | B2 |   | 3/2009  | Jacobs et al. | |

(Continued)

FOREIGN PATENT DOCUMENTS

CN    201191870 Y    2/2009

*Primary Examiner* — Xuemei Chen
(74) *Attorney, Agent, or Firm* — Finnegan, Henderson, Farabow, Garrett & Dunner LLP

(57) ABSTRACT

Embodiments of the present disclosure disclose a method for performing Optical Character Recognition (OCR) of an article. The method comprises acquiring an image of the article. The image of the article is scanned using predetermined scan settings. Then, textual regions of the scanned image of the article are identified. The OCR of the at least one of the textual regions is performed using predetermined OCR settings. One or more textual regions of the textual regions are marked upon determining an error in performing the OCR of the one or more textual regions. The OCR of the one or more textual regions is iterated as per one or more predefined OCR scanning parameters based on an OCR quality of the one or more textual regions upon marking the one or more textual regions.

12 Claims, 6 Drawing Sheets

(56) References Cited

U.S. PATENT DOCUMENTS

| | | | |
|---|---|---|---|
| 7,899,247 B2* | 3/2011 | Ohk | G06K 9/00456 |
| | | | 382/173 |
| 8,103,132 B2* | 1/2012 | Tzadok | G06K 9/033 |
| | | | 382/182 |
| 8,208,736 B2* | 6/2012 | Meyer | G06K 9/72 |
| | | | 382/209 |
| 8,270,721 B2* | 9/2012 | Schiehlen | G06K 9/00469 |
| | | | 382/161 |
| 8,472,727 B2 | 6/2013 | Gronau et al. | |
| 8,611,661 B2* | 12/2013 | Nestares | G06K 9/6857 |
| | | | 382/176 |
| 8,655,075 B2* | 2/2014 | Wyle | G06K 9/726 |
| | | | 382/182 |
| 9,317,764 B2* | 4/2016 | Baheti | G06K 9/2054 |
| 2009/0147988 A1* | 6/2009 | Jones | G06K 9/036 |
| | | | 382/100 |
| 2011/0188720 A1* | 8/2011 | Narayanan | G06K 9/20 |
| | | | 382/131 |
| 2011/0280481 A1* | 11/2011 | Radakovic | G06K 9/033 |
| | | | 382/177 |
| 2012/0265655 A1* | 10/2012 | Stroh | G06Q 40/00 |
| | | | 705/30 |
| 2014/0009778 A1* | 1/2014 | Hanano | H04N 1/00962 |
| | | | 358/1.13 |
| 2016/0180167 A1* | 6/2016 | Watts-Englert | G06F 3/0486 |
| | | | 715/748 |

\* cited by examiner

METHOD AND IMAGE PROCESSING APPARATUS FOR PERFORMING OPTICAL CHARACTER RECOGNITION (OCR) OF AN ARTICLE

PRIORITY CLAIM

This U.S. patent application claims priority under 35 U.S.C. § 119 to: Indian Application No. 1070/CHE/2015, filed on Mar. 5, 2015. The aforementioned application is incorporated herein by reference in its entirety.

TECHNICAL FIELD

The present subject matter is related, in general to Optical Character Recognition (OCR) and more particularly, but not exclusively to a method and an image processing apparatus for performing OCR of an article.

BACKGROUND

In general, one or more articles includes, without limitations, paper documents like newspapers, magazines, Portable Document Format (PDF), printed documents, brochure, images, scanned documents, books, etc. The one or more articles may contain data which can include, without limitations, texts, characters, words, images, symbols, and letters etc. A user may wish to convert the one or more articles into an Optical Character Recognition (OCR) format so that the data contained in the one or more articles can easily be recognized and extracted. One or more digital cameras are used as scanners which obtain an image of the one or more articles and then perform scanning of the image of the one or more articles. By scanning, the data contained in the one or more articles are converted into digital format for obtaining the OCR format of the one or more articles. Typically, for scanning the one or more articles the one or more digital cameras uses a predefined resolution focus to recognize and extract the data from the one or more articles.

In a conventional approach, the one or more digital cameras perform scanning of the data in the one or more articles. Such scanning may not recognize and extract each data of the one or more articles. Such failure of scanning may be due to one or more factors which include, without limitations, low resolution focus, small sized data, skewed regions of data and fast OCR scan settings etc. Thus, the conventional approach fails to extract small sized data and/or the data from skewed regions of the one or more articles. Hence, in such a way, the data extraction is failed due to failure of the scanning. Further, in the conventional approach, the extraction of texts or characters from an image involves a great challenge. The extraction of texts or characters from the image is a challenging process because the scanning is performed only once for entire article. Such one-time scanning fails to extract each data from the one or more article. In such a way, conversion of the one or more articles into the OCR format fails. Furthermore, the conventional approach comprises only single scanning process applicable for both textual regions and image regions. In such a case, extraction of the data contained especially in the image regions is a tedious process.

SUMMARY

Disclosed herein is a method for performing Optical Character Recognition (OCR) of an article. The method comprises acquiring an image of the article. The image of the article is scanned using predetermined scan settings. Then, textual regions of the scanned image of the article are identified. The OCR of the textual regions is performed using predetermined OCR settings. One or more textual regions of the textual regions are marked upon determining an error in performing the OCR of the one or more textual regions. The OCR of the one or more textual regions is iterated as per one or more predefined OCR scanning parameters based on an OCR quality of the one or more textual regions upon marking the one or more textual regions.

In an aspect of the present disclosure, an image processing apparatus for performing Optical Character Recognition (OCR) of an article is disclosed. The image processing apparatus comprises a processor and a memory communicatively coupled to the processor. The memory stores processor-executable instructions, which, on execution, cause the processor to acquire an image of the article. The processor scans the image of the article using predetermined scan settings. The processor is configured to identify textual regions of the scanned image of the article. The processor is further configured to perform the OCR of the at least one of the textual regions using predetermined OCR settings. The processor marks one or more textual regions of the textual regions upon determining an error in performing the OCR of the one or more textual regions. The processor iterates the OCR of the one or more textual regions as per one or more predefined OCR scanning parameters based on an OCR quality of the one or more textual regions upon marking the one or more textual regions.

In another aspect of the present disclosure, a non-transitory computer readable medium for performing Optical Character Recognition (OCR) of an article is disclosed. The non-transitory computer readable medium includes instructions stored thereon that when processed by a processor causes an image processing apparatus to perform operations comprising acquiring an image of the article. The medium is configured for scanning the image of the article using predetermined scan settings. The medium identifies textual regions of the scanned image of the article. The medium is configured for performing the OCR of the at least one of the textual regions using predetermined OCR settings. The medium marks one or more textual regions of the textual regions upon determining an error in performing the OCR of the one or more textual regions. The medium is configured for iterates the OCR of the one or more textual regions as per one or more predefined OCR scanning parameters based on an OCR quality of the one or more textual regions upon marking the one or more textual regions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
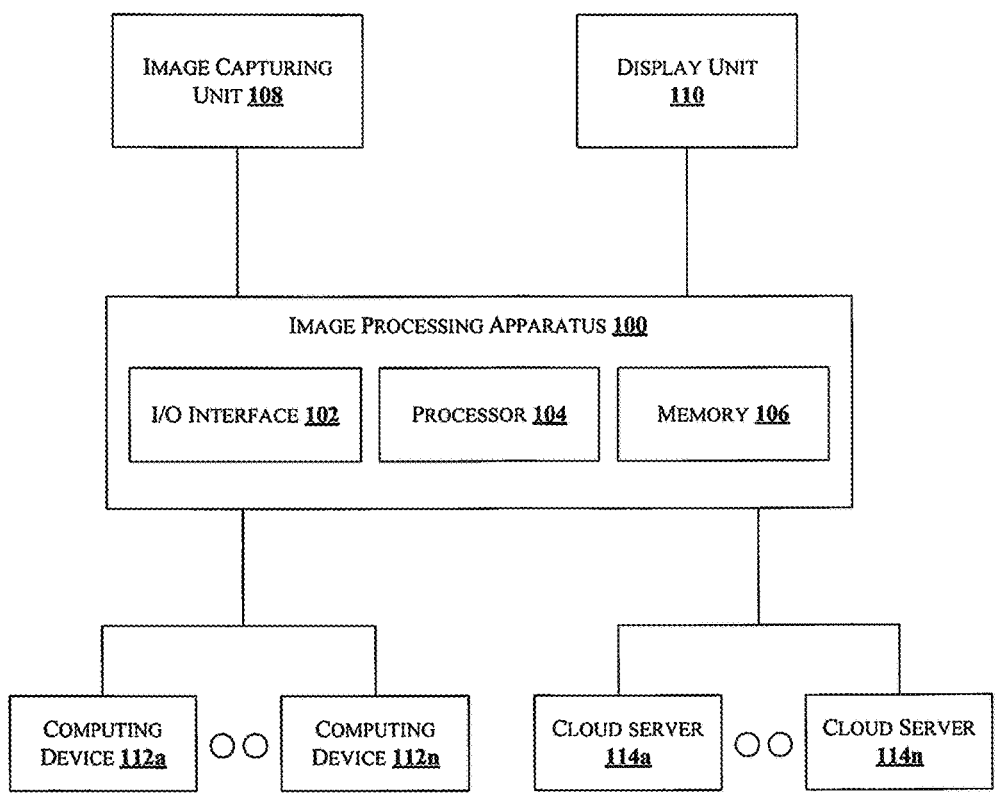
FIGS. 1a and 1b illustrate a block diagram of an exemplary image processing apparatus with processor and memory in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure are related to a method and an image processing apparatus for performing Optical Character Recognition (OCR) of an article. The method begins with capturing or acquiring an image of the article. Then, the acquired image is scanned using predefined scan settings. From the scanned image, textual regions and image regions are identified and are segregated into the textual regions and the image regions. Thereafter, the OCR is performed on the textual regions. One or more textual regions of the textual regions are marked when an error in performing the OCR of the one or more textual regions is determined. The OCR of the one or more textual regions is iterated until predetermined OCR scanning parameters are satisfied based on an OCR quality of the one or more textual regions.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a illustrates a block diagram of an exemplary image processing apparatus 100 with processor 104 and memory 106 in accordance with some embodiments of the present disclosure.

The image processing apparatus 100 is related to performing Optical Character Recognition (OCR) of an article. The article includes, but is not limited to, paper documents like newspapers, magazines, Portable Document Format (PDF) document, printed documents, brochure, images, scanned documents, books, etc. The article can include article data which includes, but is not limited to, texts, characters, words, symbols, photos, and letters etc. One or more components configured in the image processing apparatus 100 for performing the OCR are explained in detail in the following description.

In the illustrated FIG. 1a, the image processing apparatus 100 is communicatively associated to an image capturing unit 108. The image capturing unit 108 includes, without limitations, camera which is related to capture image of the article.

In one implementation, the image capturing unit 108 may be configured in one or more computing devices 112a, . . . , 112n (collectively referred to 112) which becomes a camera enabled computing device. For example, camera enabled computing device i.e. the one or more computing devices 112 include, but are not limited to, mobiles phones, tablet, notebook, audio- and video-file players (e.g., MP3 players and iPODs), digital cameras, smartphone, wearable device and the like. In an embodiment, the image of the article captured by the image capturing unit 108 is received by the image processing apparatus 100 for performing the OCR of the article. In an embodiment, the article can be received by the image processing apparatus 100 from the one or more computing devices 112 through the image capturing unit 108 communicatively connected to the one or more computing devices 112. In one implementation, the image processing apparatus 100 is configured in the one or more computing devices 112.

The one or more cloud servers 114a, . . . 114n (collectively referred to 114) stores the article. The article is accessible or acquired from the one or more cloud servers 114 via one or more ways. The one or more ways include, but are not limited to, Electronic mail (email) of the article, accessing the article through Hyper Text Mark-up Language (HTML), downloading the article from one or more portals associated to the one or more cloud servers 114, copying the article in to a storage unit of a device communicatively connected to the one or more cloud servers 114 etc. In an embodiment, the image of the article is captured by the image capturing unit associated to the image processing apparatus 100 upon accessing the article. In one implementation, the image processing apparatus 100 is configured in the one or more cloud servers 114 for performing the OCR of the article.

In the illustrated FIG. 1*a*, the image processing apparatus 100 is communicatively connected to an associated display unit 110. The display unit 110 can be configured in the one or more computing devices 112, for example, user interface of the one or more computing devices 112 is considered as the display unit 110. In one implementation, the display unit 110 is communicatively connected to the one or more cloud servers 114. In an embodiment, the display unit 110 displays the image of the article captured by the image capturing unit 108. The display unit 110 displays segregation of textual regions and image regions along with marking of the textual regions and/or the image regions in a scanned image of the article. Further, the display unit 110 displays marking of one or more textual regions of the textual regions, which are recognized and extracted while performing the OCR of the one or more textual regions. Furthermore, the display unit 110 displays a report on iterations along with information of one or more predefined OCR scanning parameters applied for iterations of the OCR of the one or more textual regions. Additionally, in an embodiment, the display unit 110 displays information on predetermined resolution quality used for performing the OCR of the one or more textual regions.

Figure 1B:
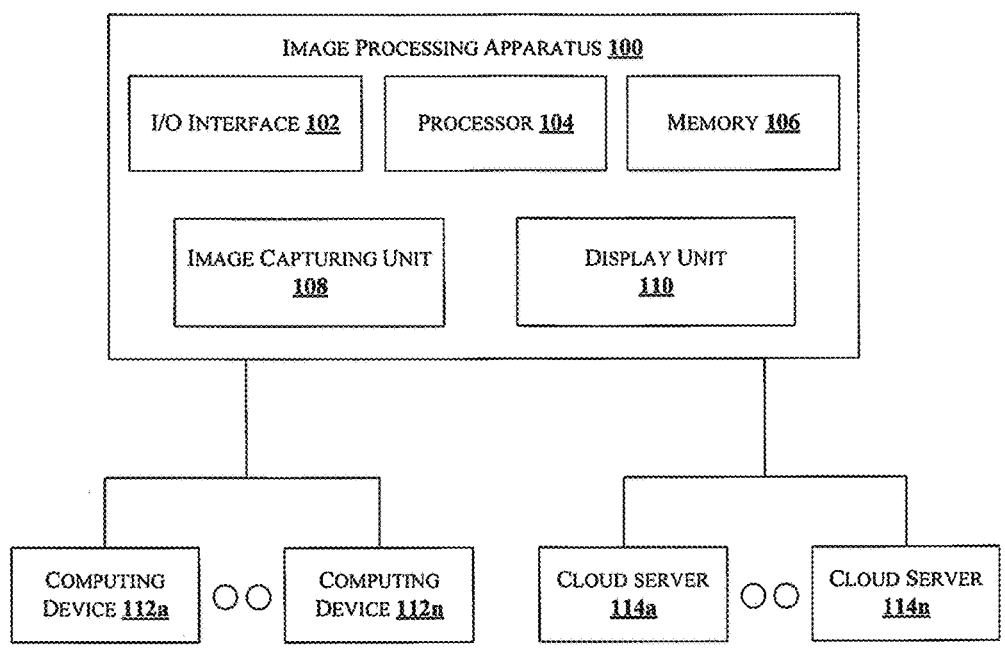

In an embodiment, the image capturing unit 108 and the display unit 110 are configured in the image processing apparatus as shown in FIG. 1*b*.

The image processing apparatus 100 may include input/output (I/O) interface 102, at least one central processing unit ("CPU" or "processor") 104, and a memory 106.

The I/O interface 102 is an interface through which the one or more inputs are received and one or more outputs are provided. The I/O interface 102 acquires the image of the article. The I/O interface 102 provides a display of the segregation of the textual regions and the image regions along with the marking of the textual regions and the image regions to the display unit 110. The I/O interface 102 provides the marking of the one or more textual regions which are not been recognized and extracted while performing the OCR of the one or more textual regions. In an embodiment, the I/O interface 102 provides the report on iterations along with the information of the one or more predefined OCR scanning parameters applied for the iterations for display on the display unit 110. Additionally, the information on the predetermined resolution quality used for performing the OCR of the one or more textual regions are provided for display on the display unit 110 through the I/O interface 102. In an embodiment, the I/O interface 102 is coupled with the processor 104. In an embodiment, the processor 104 receives the one or more inputs and provides the one or more outputs related to the OCR through the I/O interface 102. Particularly, the acquiring of the image of the article is performed through the I/O interface 102. Further, a result of the segregation of the image of the article, the marking of the one or more textual regions, the iterations of the OCR of the one or more textual regions using the one or more predefined OCR scanning parameters and/or the predetermined resolution quality are provided for display on the display unit 110 through the I/O interface 102.

The processor 104 may comprise at least one data processor for executing program components for executing user- or apparatus-generated image of the article. The processor 104 performs the scanning of the textual regions using predetermined scan settings. The processor 104 is configured to segregate the scanned image of the article into the textual regions and the image regions. In an embodiment, the processor 104 marks the segregated textual regions and the segregated image regions along with identifying the textual regions of the scanned image of the article. The processor 104 is configured to perform the OCR of the textual regions and mark the one or more textual regions of the textual regions upon determining the error in performing the OCR of the one or more textual regions. In an embodiment, the processor 104 iterates the performance of the OCR of the one or more textual regions as per the one or more predefined OCR scanning parameters based on the OCR scan quality. Additionally, the processor 104 performs modification of the predetermined OCR settings for performing the OCR using the predetermined resolution quality of the one or more textual regions. In an embodiment, the processor 104 executes one or more modules for performing the OCR of the article. The one or more modules are described in the following description of the disclosure.

The memory 106 stores instructions that are executable by the at least one processor 104. The memory 106 stores the captured or acquired image of the article, the predetermined scan settings, the predetermined OCR settings, the one or more predefined OCR scanning parameters and the predetermined resolution quality. In an embodiment, the predetermined scan settings, the predetermined OCR settings, the one or more predefined OCR scanning parameters and the predetermined resolution quality are stored as one or more data required for performing the OCR of the article which is described in the following description of the disclosure.

Figure 2A:
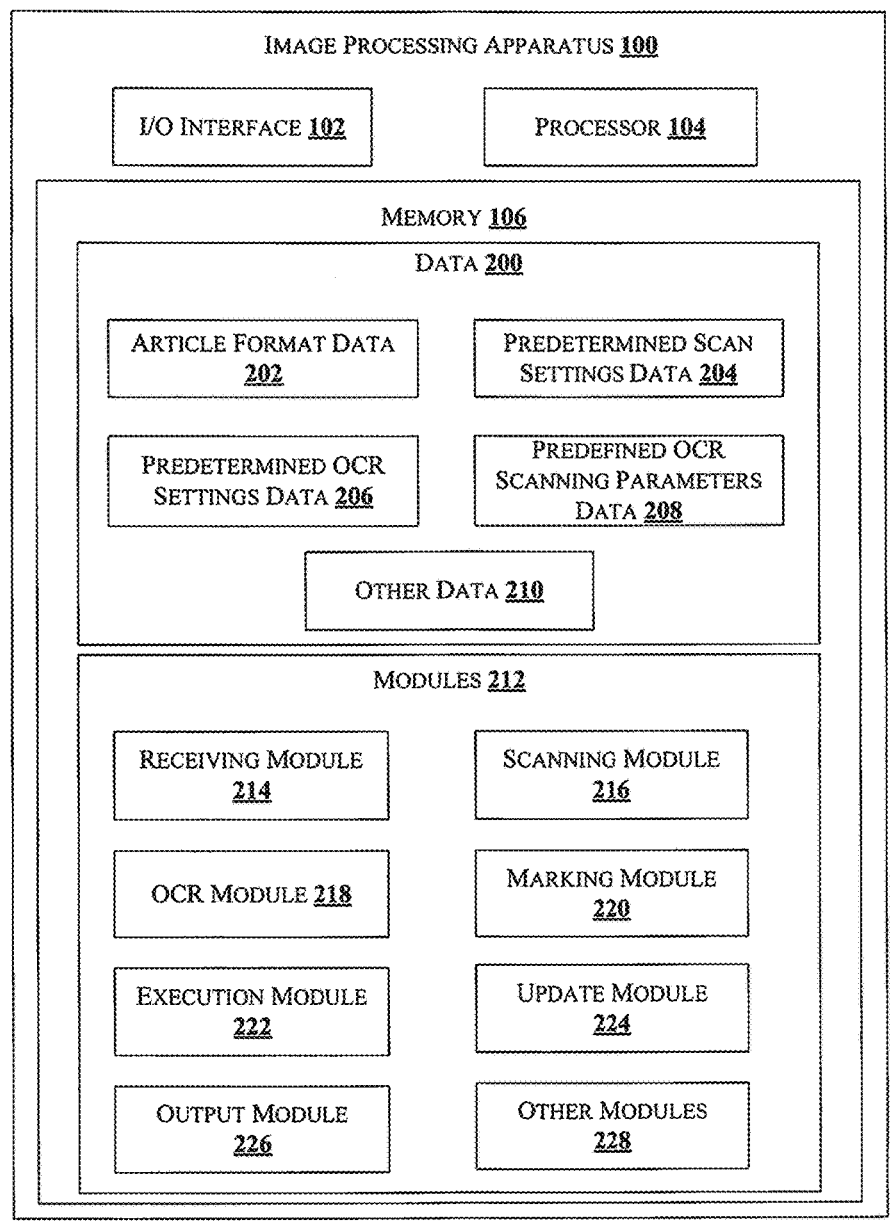
FIG. 2a illustrates a block diagram of an exemplary image processing apparatus with various data and modules for performing Optical Character Recognition (OCR) of an article in accordance with some embodiments of the present disclosure.

FIG. 2*a* illustrates a block diagram of the exemplary image processing apparatus 100 with various data and modules for performing OCR of the article in accordance with some embodiments of the present disclosure. In the illustrated FIG. 2*a*, the one or more data 200 and the one or more modules 212 stored in the memory 106 are described herein in detail.

In an embodiment, the one or more data 200 may include, for example, article format data 202, predetermined scan settings data 204, predetermined OCR settings data 206, predefined OCR scanning parameters data 208 and other data 210 preconfigured for usage in performing OCR of the article in real-time and accurately.

In an embodiment, the article format data 202 refers to kinds of the article on which the OCR can be performed. The kinds of the article may refer to the PDF document, newspaper, magazine, printed documents, brochure, images, scanned documents, books, etc. on which the OCR can be performed. For example, consider the article acquired through the image capturing unit 108 is a PDF document. Hence, the image processing apparatus 100 can perform OCR on the PDF document since the PDF document is one of the kinds of the article stored as the article format data 202.

The predetermined scan settings data 204 refers to settings to be used to scan the image of the article. In one implementation, the predetermined scan settings refer to traditional way of scanning the image of the article. In an embodiment, the predetermined scan settings enable to segregate the textual regions and the image regions. The predetermined scan settings include, but are not limited to, scan resolution, lighting corrections and skew correction of the image of the article.

The predetermined OCR settings data 206 refers to OCR settings to be used for performing OCR on the textual regions of the scanned image of the article. In an embodiment, the OCR settings depend on an OCR engine selection.

The predetermined OCR settings enable to mark the one or more textual regions of the textual regions upon determining the error in performing OCR of the one or more textual regions. The predetermined OCR settings data 206 may include marking data (not shown in FIG. 2a). In an embodiment, the marking data refers to kinds of marking which can comprise highlighting and/or lowlighting. In one implementation, the kinds of marking also include, without limitations, shape of the marking for example circular marking, rectangular marking etc. and colors combinations of the markings. The textual regions and the image regions upon segregation are marked using the marking data. Also, the one or more textual regions upon determining the error in performing OCR of the one or more textual regions are marked using the marking data.

In an embodiment, the predetermined OCR settings data 206 includes the OCR quality predefined to be produced upon performing the OCR of the one or more textual regions. Additionally, the predetermined OCR settings data 206 includes predetermined resolution quality to be used for establishing high resolution quality on the one or more textual regions for performing OCR of the one or more textual regions.

The predefined OCR scanning parameters data 208 refers to OCR scanning parameters to be used for performing OCR of the one or more textual regions. In an embodiment, the OCR scanning parameters includes, without limitations, predefined number of iterations of the OCR to be performed and an amount of the OCR to be performed on the one or more textual regions. For example, the number of iterations of the OCR may be configured to be five iterations of the OCR on PDF document to recognize and extract the article data of the article when the OCR quality of the article is low and/or blurred/imprecise. The amount of the OCR can be referred as a percentage for which the OCR is required to be performed on the article. For example, the percentage can be set to 80%. Hence, the 80% of OCR is performed on the PDF document to recognize, extract and convert the article data into digitized form as per the OCR process.

The other data 210 may refer to such data which can be preconfigured in the image processing apparatus 100 for performing OCR of the article.

In an embodiment, the one or more data 200 in the memory 106 are processed by the one or more modules 212 of the image processing apparatus 100. The one or more modules 212 may be stored within the memory 106 as shown in FIG. 2a. In an example, the one or more modules 212, communicatively coupled to the processor 104, may also be present outside the memory 106. Particularly, the one or more data 200 in the memory 106 including the predetermined scan settings, the predetermined OCR settings and the predefined OCR scanning parameters are used by the one or more modules 212. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the one or more modules 212 may include, for example, a receive module 214, a scanning module 216, an OCR module 218, a making module 220, an execution module 222, an update module 224, and an output module 226. The memory 106 may also comprise other modules 228 to perform various miscellaneous functionalities of the image processing apparatus 100. It will be appreciated that such aforementioned modules may be represented as a single module or a combination of different modules.

In an embodiment, the receive module 214 is configured to acquire the image of the article from the image capturing unit 108. The receive module 214 checks whether the acquired image of the article is one of the kinds of the article present in the article format data 202. If the acquired image of the article is one of the kinds of the article, then the process of performing OCR of the article is performed.

Figure 2B:
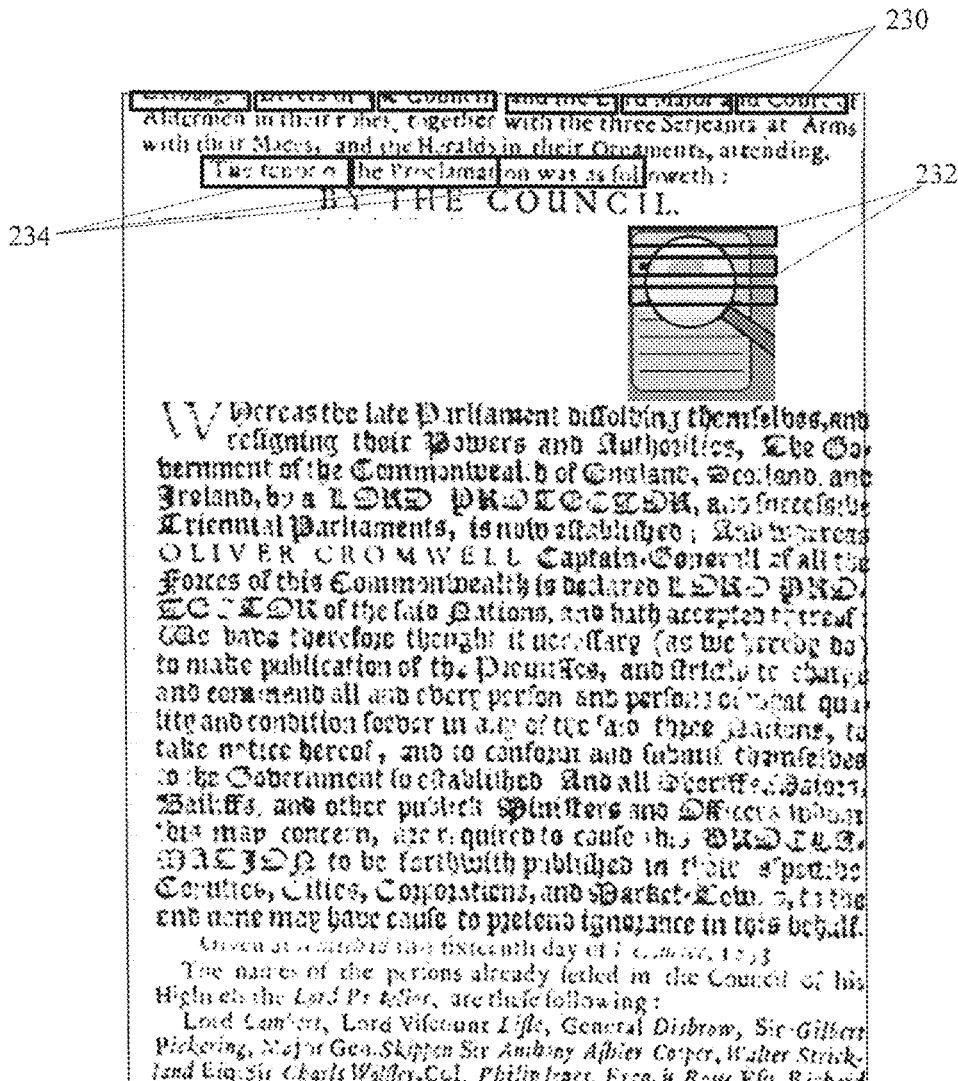
FIG. 2b illustrates an exemplary embodiment for segregating an image of an article into textual regions and image regions in accordance with some embodiments of the present disclosure.

The scanning module 216 is related to scan the image of the article using predetermined scan settings stored as the predetermined scan settings data 204. In an embodiment, upon scanning the image of the article, the textual regions and the image regions of the scanned image of the article are segregated. FIG. 2b shows segregation of the image of the article into the textual regions depicted by 230 and the image regions depicted by 232. The textual regions refer to image regions having the texts, characters, symbols, words etc. as shown by 230 and the image regions refer to an image regions having image as shown by 232. In one implementation, the image of the article is segregated into smaller rectangular regions using a technique of Mixed Raster Content (MRC). In one implementation, histogram analysis is performed to segregate the textual regions and the image regions. Particularly, the histogram analysis with entropy calculation is used to determine a block-type whether the article data is text or an image. For identifying the text and natural imagery separately, the image of the article is decomposed into segments based on preset conditions. After segmentation, a histogram is generated for each segment to calculate the frequency distribution i.e. entropy calculation of pixel colors. Based on entropy levels, the blocks can be identified as the textual regions or the image regions.

In an embodiment, another technique known as statistical analysis is used for segregating the image of the article into the textual regions and the image regions. The statistical analysis performs calculating energy for each pixel of the image of the article by using co-concurrence matrix and morphological operations.

In an embodiment, boundary/perimeter detection technique is used for segregating the image of the article into the textual regions and the image regions. The boundary/perimeter detection technique performs block segmentation and block identification. Initially, the image of the article is segmented into several non-overlapping blocks by utilizing a recursive segmentation technique. Upon segmentation, two kinds of features namely connected components and image boundary/perimeter features are extracted. The two kinds of features are verified to be effective in characterizing the blocks of the image of the article. After verification, the blocks are identified and segregated into the textual regions and the image regions.

In an embodiment, the segregated textual regions and the segregated image regions are marked using the marking data as shown by 230 and 232 respectively. The marking of the segregated textual regions and the segregated image regions is performed based on the scan quality of the article upon performing the scanning using the predetermined scan settings. For example, the marking is performed when the scan quality of the image of the article is low. In an embodiment, the marking of the textual regions and the image regions are indicated and displayed on the display unit 110.

The textual regions of the scanned image of the article are identified by the scanning module 216 upon marking the textual regions and the image regions.

The OCR module 218 performs OCR of the textual regions using the predetermined OCR settings from the predetermined OCR settings data 206.

The marking module 220 marks the one or more textual regions of the textual regions when the error in performing the OCR of the one or more textual regions is determined by the OCR module 218. The marking of the one or more textual regions is performed using the marking data. The marking of the one or more textual regions upon determining the error in the performance of OCR is depicted by 234 in FIG. 2b. In an embodiment, the marking of the one or more textual regions depends on the OCR quality of the one or more textual regions. The marking of the one or more textual regions are indicated and displayed on the display unit 110.

The execution module 222 iterates the OCR of the one or more textual regions as per the one or more predefined OCR scanning parameters from the predefined OCR scanning parameters data 208. The iterations of the OCR are carried out based on the OCR quality of the one or more textual regions. For example, iterations are carried out when the OCR quality of the one or more textual regions is of low resolution which results in failure in recognizing the article data accurately. In an embodiment, the iterations of the OCR of the one or more textual regions are carried out until the number of the predefined number of iterations of the OCR and/or the amount of the OCR of the one or more textual regions are satisfied. For example, consider the number of iterations be performed is five iterations. Therefore, iterations of the OCR are performed five times. Consider the percentage of the conversion of the texts from the textual regions must be performed for 80%. Hence, the iterations of the OCR are carried out until 80% of the conversion is achieved. In an embodiment, the numbers of iterations and the amount iterations to be performed are indicated on the display unit 110.

The update module 224 enables to modify the predetermined OCR settings to perform the OCR of the one or more textual regions with the predetermined resolution quality. In an embodiment, the modification of the predetermined OCR settings is performed when there is a failure in performing OCR of the one or more textual regions using the predefined OCR scanning parameters.

The output module 226 provides a final OCR formatted article to the display unit 110.

The other modules 228 processes all such operations required to perform the OCR of the article by the image processing apparatus 100.

Figure 3:
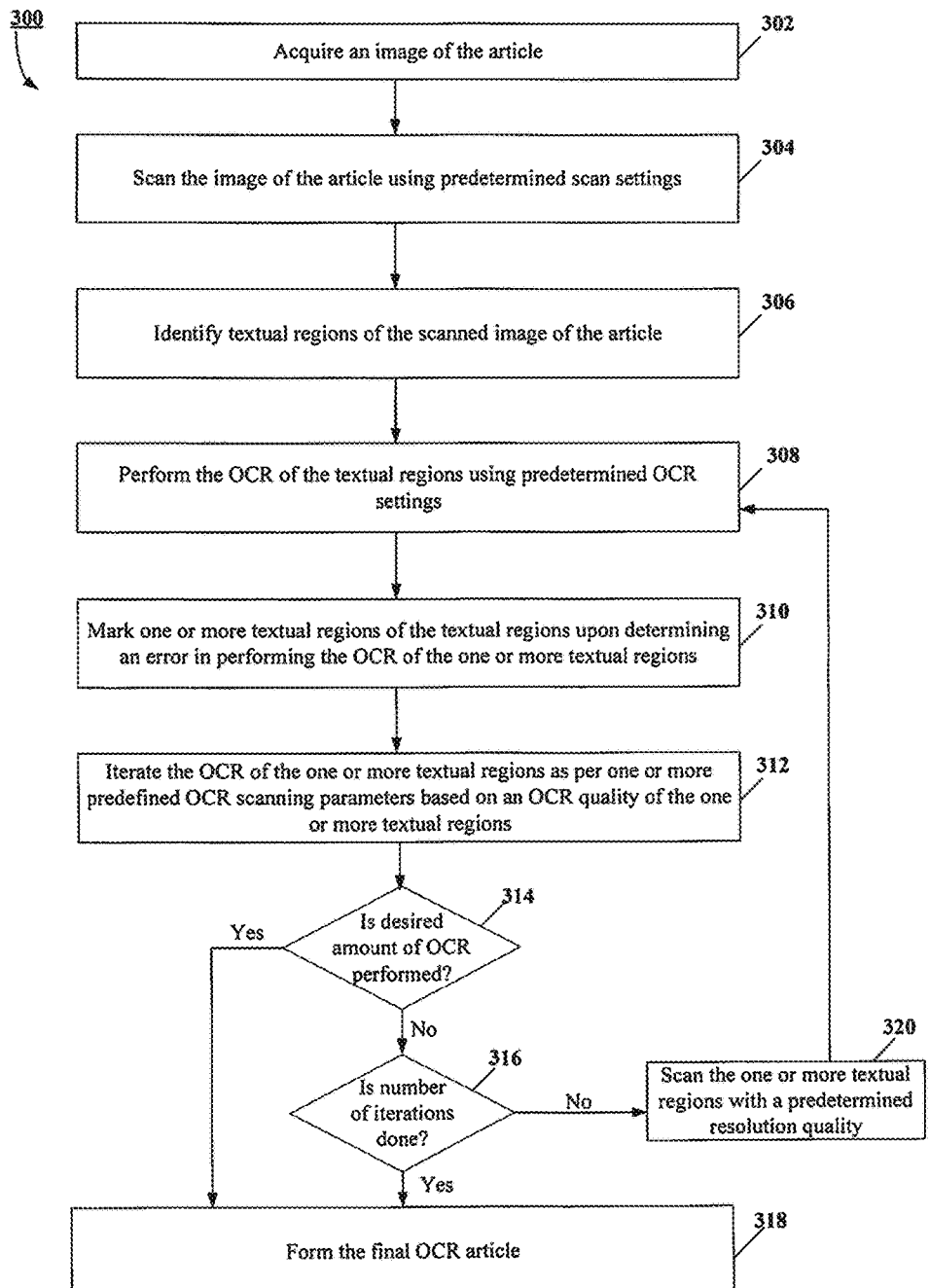
FIG. 3 shows a flowchart illustrating a method for performing Optical Character Recognition (OCR) of an article in accordance with some embodiments of the present disclosure.

FIG. 3 shows a flowchart illustrating a method 300 for performing OCR of the article in accordance with some embodiments of the present disclosure.

As illustrated in FIG. 3, the method comprises one or more blocks for performing the OCR of the article by the image processing apparatus 100. The method may be described in the general context of computer executable instructions. Generally, computer executable instructions can include routines, programs, objects, components, data structures, procedures, modules, and functions, which perform particular functions or implement particular abstract data types.

The order in which the method is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 302, the image of the article is acquired by the image processing apparatus 100. In an embodiment, the image of the article is captured by the image capturing unit 108 through which the image of the article is acquired.

At block 304, the image of the article is scanned by the image processing apparatus 100 using the predetermined scan settings.

At block 306, the textual regions of the scanned image of the article are identified by the image processing apparatus 100. In an embodiment, the textual regions are identified upon performing segregation of the scanned image of the article into the textual regions and the image regions. In one implementation, the textual regions and the image regions upon segregation are marked. The marking of the textual regions and the image regions depends on the scan quality of the scanned image of the article. In an embodiment, the marked textual regions and the marked image regions are displayed on the display unit 110 associated to the image processing apparatus 100.

At block 308, the OCR of the textual regions is performed by the image processing apparatus 100 using the predetermined OCR settings upon identification of the textual regions.

At block 310, the one or more textual regions of the textual regions are marked when the error in performing the OCR of the one or more textual regions is determined by the image processing apparatus 100.

At block 312, the OCR of the one or more textual regions is iterated by the image processing apparatus 100 as per the one or more predefined OCR scanning parameters. In one implementation, the iterations are performed based on the OCR quality of the one or more textual regions. In an embodiment, the one or more predefined OCR scanning parameters comprise the predefined number of iterations of the OCR and/or the amount of the OCR of the one or more textual regions. In an embodiment, the predefined number of iterations of the OCR and the amount of the OCR of the one or more textual regions are indicated on the display unit 110 while iterating the OCR.

At block 314, a condition is checked whether the desired amount of iteration of the OCR is achieved. If the desired amount of iterations of the OCR is achieved, then the process goes to block 318 via "Yes" where the final OCR formatted article is generated and provided on the display unit 110. If the desired amount of iterations of the OCR is failed, then the process goes to block 316 via "No". At block 316, a condition is checked whether the number of iterations as predefined is performed. If the number of iterations is performed, then the process goes to block 318 via "Yes" where the final OCR formatted article is generated and displayed on the display unit 110. If the number of iterations is failed to be achieved, then the process goes to block 320 via "No" where the one or more textual regions are scanned using the predetermined resolution quality. In an embodiment, the predetermined resolution quality is usable upon modifying the predetermined OCR settings. Upon performing the scanning using the predetermined resolution quality, the process goes to block 308.

System

Figure 4:
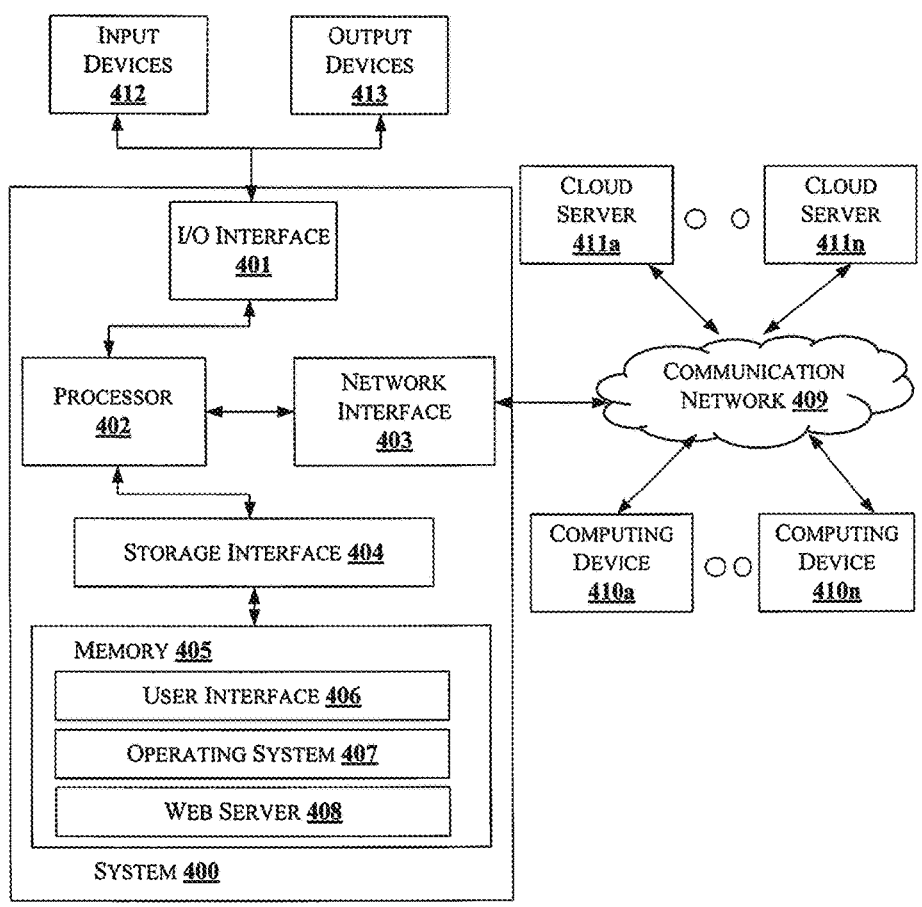
FIG. 4 illustrates a block diagram of an exemplary system for implementing embodiments consistent with the present disclosure.

FIG. 4 illustrates a block diagram of an exemplary system 400 for implementing embodiments consistent with the present disclosure. In an embodiment, the system 400 is used to implement the image processing apparatus 100. The system 400 may comprise a central processing unit ("CPU" or "processor") 402. The processor 402 may comprise at least one data processor for executing program components for performing OCR of the article. The processor 402 may include specialized processing units such as integrated system (bus) controllers, memory management control units, floating point units, graphics processing units, digital signal processing units, etc.

The processor 402 may be disposed in communication with one or more input/output (I/O) devices (412 and 413) via I/O interface 401. The I/O interface 401 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

The I/O interface(s) 401 may include a variety of software and hardware interfaces, for example, a web interface, a graphical user interface, etc. Using the I/O interface 401, the system 400 may communicate with one or more I/O devices (412 and 413). For example, the input device 412 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. The output device 413 may be a printer, fax machine, video display (e.g., cathode ray tube (CRT), liquid crystal display (LCD), light-emitting diode (LED), plasma, or the like), audio speaker, etc.

In some embodiments, the processor 402 may be disposed in communication with a communication network 409 via a network interface 403. The network interface 403 may communicate with the communication network 409. In an embodiment, the communication network 409 includes a first network, and a second network. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 409 may include, without limitation, a direct interconnection, local area network (LAN), wide area network (WAN), wireless network (e.g., using Wireless Application Protocol), the Internet, etc. Using the network interface 403 and the communication network 409, the system 400 may communicate with the one or more computing devices 410a, . . . , 410n through the first network and the one or more cloud servers 411a, . . . , 411n through the second network.

In one implementation, the first network and the second network includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc. The network interface 403 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The one or more computing devices 410a, . . . , 410n may include, without limitation, personal computer(s), server(s), fax machines, printers, scanners, various mobile devices such as cellular telephones, smartphones, tablet computers, eBook readers, laptop computers, notebooks, gaming consoles, or the like. In an embodiment, the article is acquired from the one or more computing devices 410a, . . . , 410n and the one or more cloud servers 411a, . . . , 411n.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 405 may store a collection of program or database components, including, without limitation, user interface application 406, an operating system 407, web server 408 etc. In some embodiments, system 400 may store user/application data 406, such as the data, variables, records, etc. as described in this disclosure. Such databases may be implemented as fault-tolerant, relational, scalable, secure databases such as Oracle or Sybase.

The operating system 407 may facilitate resource management and operation of the system 400. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 406 may facilitate display, execution, interaction, manipulation, or operation of program components through textual or graphical facilities. For example, user interfaces may provide computer interaction interface elements on a display system operatively connected to the system 400, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the system 400 may implement a web browser 408 stored program component. The web browser 408 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet message access protocol (IMAP), messaging application programming interface (MAPI), Microsoft Exchange, post office protocol (POP), simple mail transfer protocol (SMTP), or the like. In some embodiments, the computer system 1000 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

Advantages of the embodiment of the present disclosure are illustrated herein.

Embodiments of the present disclosure perform OCR of the article until each textual region are recognized and extracted.

Embodiments of the present disclosure provide an accurate technique to convert the article into the OCR format without losing any text.

Embodiments of the present disclosure iterate the OCR of the article repeatedly. Such a way of iteration recognizes and extracts article data of the article more accurately. Also, unlike the conventional approach, even small sized data, and/or data from skewed regions etc. can be recognized and extracted. In an embodiment, having high resolution quality to perform the OCR of the article is not necessary in the present disclosure since iterations of the OCR are carried out until the data is recognizable and extractable.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Image Processing Apparatus |
| 102 | I/O Interface |
| 104 | Processor |
| 106 | Memory |
| 108 | Image Capturing Unit |
| 110 | Display Unit |
| 112a, . . . , 112n | Computing Device |
| 114a, . . . , 114n | Cloud Server |
| 200 | Data |
| 202 | Article Format Data |
| 204 | Predetermined Scanning Settings Data |
| 206 | Predetermined OCR Settings Data |
| 208 | Predefined OCR Scanning Parameters Data |
| 210 | Other Data |
| 212 | Modules |
| 214 | Receiving Module |
| 216 | Scanning Module |
| 218 | OCR Module |
| 220 | Marking Module |
| 222 | Execution Module |
| 224 | Update Module |
| 226 | Output Module |
| 228 | Other Modules |
| 400 | System |
| 401 | I/O Interface |
| 402 | Processor |
| 403 | Network Interface |
| 404 | Storage Interface |
| 405 | Memory |
| 406 | User Interface |
| 407 | Operating System |
| 408 | Web Server |
| 409 | Communication Network |
| 410a, . . . , 410n | Computing Devices |
| 411a, . . . , 411n | Cloud Servers |
| 412 | Input Devices |
| 413 | Output Devices |

We claim:

1. A method for performing Optical Character Recognition (OCR) of an article, the method comprising:
    acquiring, by an image processing apparatus, an image of the article;
    scanning, by the image processing apparatus, the image of the article using predetermined scan settings;
    identifying, by the image processing apparatus, textual regions of the scanned image of the article by:
        segregating the scanned image of the article into the textual regions and image regions, wherein the segregation is based on a boundary detection technique comprising:
            performing block segmentation and block identification on the scanned image,
                wherein the block segmentation comprises segmenting the image of the article into a plurality of non-overlapping blocks based on performing recursive segmentation on the image of the article, and
                wherein the block identification comprises extracting connected components and image boundary features from the non-overlapping blocks,
                wherein a verification is performed to determine whether the connected components and the image boundary features characterize the non-overlapping blocks of the image of the article, and
                wherein each of the non-overlapping blocks is segregated into the textual region and image region based on the verification; and
        marking, upon segregating the scanned image, the textual regions and the image regions based on a scan quality of the scanned image of the article;
    performing, by the image processing apparatus, the OCR of the textual regions using predetermined OCR settings;
    marking, by the image processing apparatus, one or more textual regions of the textual regions upon determining an error in performing the OCR of the one or more textual regions; and
    iterating, by the image processing apparatus, the OCR of the one or more textual regions as per one or more predefined OCR scanning parameters based on an OCR quality of the one or more textual regions upon marking the one or more textual regions, wherein iterating the OCR comprises scanning the one or more textual regions with a pre-determined resolution quality.

2. The method as claimed in claim 1 further comprising displaying by the image processing apparatus, at least one of the marked textual regions and the marked image regions on a display unit associated to the image processing apparatus.

3. The method as claimed in claim 1, wherein the one or more predefined OCR scanning parameters comprise at least one of predefined number of iterations of the OCR and an amount of the OCR of the one or more textual regions.

4. The method as claimed in claim 3 further comprising indicating by the image processing apparatus, at least one of the predefined number of iterations of the OCR and the amount of the OCR of the one or more textual regions on the display unit while iterating the OCR.

5. The method as claimed in claim 1 further comprising modifying by the image processing apparatus, the predetermined OCR settings for performing the OCR of the one or more textual regions using the predetermined resolution quality of the one or more textual regions in each iteration.

6. An image processing apparatus for performing Optical Character Resolution (OCR) of an article comprising:
a processor;
a memory communicatively coupled to the processor, wherein the memory stores processor-executable instructions, which, on execution, cause the processor to:
acquire an image of the article;
scan the image of the article using predetermined scan settings;
identify textual regions of the scanned image of the article by:
segregating the scanned image of the article into the textual regions and image regions, wherein the segregation is based on a boundary detection technique comprising:
performing block segmentation and block identification on the scanned image,
wherein the block segmentation comprises segmenting the image of the article into a plurality of non-overlapping blocks based on performing recursive segmentation on the image of the article, and
wherein the block identification comprises extracting connected components and image boundary features from the non-overlapping blocks,
wherein a verification is performed to determine whether the connected components and the image boundary features characterize the non-overlapping blocks of the image of the article, and
wherein each of the non-overlapping blocks is segregated into the textual region and image region based on the verification; and
marking, upon segregating the scanned image, the textual regions and the image regions based on a scan quality of the scanned image of the article;
perform the OCR of the textual regions using predetermined OCR settings;
mark one or more textual regions of the textual regions upon determining an error in performing the OCR of the one or more textual regions; and
iterate the OCR of the one or more textual regions as per one or more predefined OCR scanning parameters based on an OCR quality of the one or more textual regions upon marking the one or more textual regions, wherein iterating the OCR comprises scanning the one or more textual regions with a predetermined resolution quality.

7. The image processing apparatus as claimed in claim 6 is communicatively connected to one or more computing devices, wherein the article is acquired from the one or more computing devices.

8. The image processing apparatus as claimed in claim 6 is associated to a display unit configured to display at least one of the marked textual regions and the marked image regions on the display unit.

9. The image processing apparatus as claimed in claim 6, wherein the one or more predefined OCR scanning parameters comprise at least one of predefined number of iterations of the OCR and an amount of the OCR of the one or more textual regions.

10. The image processing apparatus as claimed in claim 9, wherein the processor is further configured to indicate at least one of the predefined number of iterations of the OCR and the amount of the OCR of the one or more textual regions.

11. The image processing apparatus as claimed in claim 6, wherein the processor is further configured to modify the predetermined OCR settings for performing the OCR of the one or more textual regions using the predetermined resolution quality of the one or more textual regions in each iteration.

12. A non-transitory computer readable medium including instructions stored thereon that when processed by a processor cause an image processing apparatus to perform acts of:
acquiring an image of the article;
scanning the image of the article using predetermined scan settings;
identifying textual regions of the scanned image of the article by:
segregating the scanned image of the article into the textual regions and image regions, wherein the segregation is based on a boundary detection technique comprising:
performing block segmentation and block identification on the scanned image,
wherein the block segmentation comprises segmenting the image of the article into a plurality of non-overlapping blocks based on performing recursive segmentation on the image of the article, and
wherein the block identification comprises extracting connected components and image boundary features from the non-overlapping blocks,
wherein a verification is performed to determine whether the connected components and the image boundary features characterize the non-overlapping blocks of the image of the article, and
wherein each of the non-overlapping blocks is segregated into the textual region and image region based on the verification; and
marking, upon segregating the scanned image, the textual regions and the image regions based on a scan quality of the scanned image of the article;
performing the OCR of the textual regions using predetermined OCR settings;
marking one or more textual regions of the textual regions upon determining an error in performing the OCR of the one or more textual regions; and
iterating the OCR of the one or more textual regions as per one or more predefined OCR scanning parameters based on an OCR quality of the one or more textual regions upon marking the one or more textual regions, wherein iterating the OCR comprises scanning the one or more textual regions with a pre-determined resolution quality.

* * * * *